Dec. 27, 1932. J. C. THOMPSON 1,892,119
NUT LOCK
Filed Jan. 17, 1931

James C. Thompson,
INVENTOR.

BY J. Stanley Birch
ATTORNEY.

Patented Dec. 27, 1932

1,892,119

BEST AVAILABLE COPY

UNITED STATES PATENT OFFICE

JAMES C. THOMPSON, OF CLEVELAND, OHIO, ASSIGNOR OF ONE-HALF TO CECIL B. LEMON, OF LAKEWOOD, OHIO

NUT LOCK

Application filed January 17, 1931. Serial No. 509,490.

The present invention contemplates the provision of a nut lock, which is simple in construction, and designed to positively prevent retrograde movement of the nut on the bolt.

In carrying out my invention, I provide a nut characterized with a locking flange portion of relatively soft material, adapted to be bent into a groove formed in the bolt, with the parts constructed to prevent retrograde movement of the nut on the bolt, when subjected to vibrations or the like, although allowing the nut to be conveniently removed from the bolt with a suitable tool when desired.

The nature and advantages of the invention will be better understood when the following detailed description is read in connection with the accompanying drawing, the invention residing in the construction, combination and arrangement of parts as claimed.

In the drawing forming part of this application like numerals of reference indicate similar parts in the several views and whereing:

Figure 1:
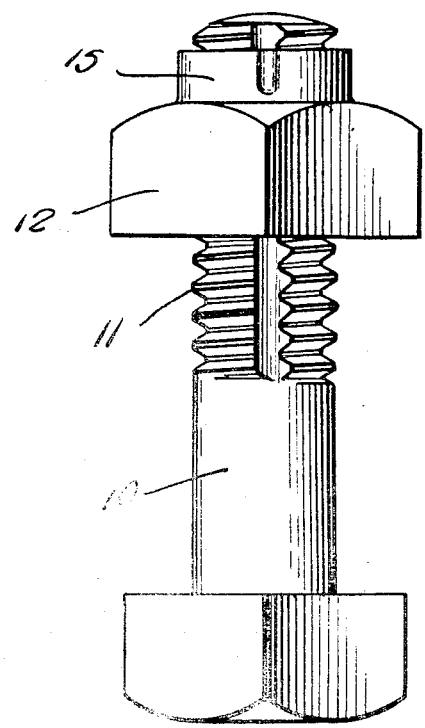
Figure 1 is a view in elevation showing the nut and bolt associated.
Figure 2:
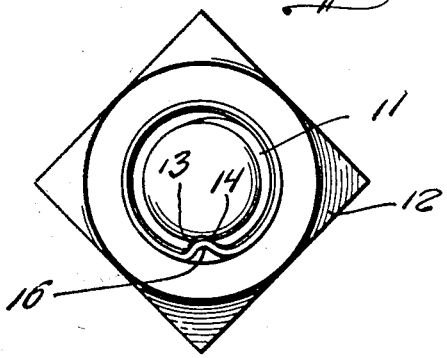
Figure 2 is an end elevation showing how the nut is locked on the bolt.
Figure 3:
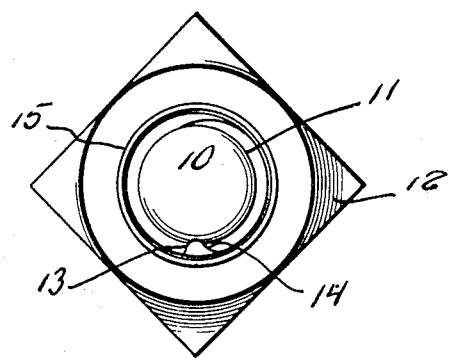
Figure 3 is a similar view showing the nut associated with the bolt before it is locked to the bolt.
Figure 4:
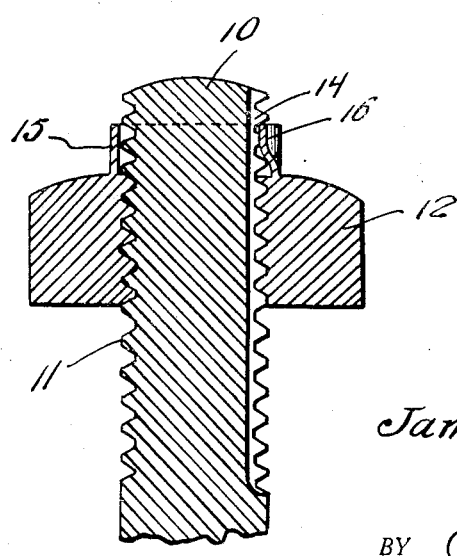
Figure 4 is a fragmentary longitudinal sectional view through Figure 1.

Referring to the drawing in detail, 10 indicates a bolt of any ordinary well known construction, preferably provided with a standard U. S. flat top thread 11, while the nut is indicated at 12. The bolt 10 is formed with a longitudinal groove extending throughout the threaded portion thereof, and which groove is formed to provide a substantially straight wall 13 and an obliquely disposed wall 14.

The nut is adapted to be threaded upon the bolt in the usual manner, but the nut is characterized by an annular unthreaded locking flange 15 which is an integral part of the nut and arranged at one end thereof as clearly illustrated. The nut 12 and its flange 15 are constructed of relatively softer material than the bolt 10, and flange 15 is adapted to be formed with an indent 16 received by the bolt groove to lock the nut on the bolt.

In practice, the nut 12 is threaded upon the bolt in the usual manner, and when given its final position thereon, the flange 15 is struck inwardly to form the indent 16 which is received by the groove of the bolt, thereby locking the nut on the bolt in a manner to positively prevent retrograde movement of the nut under any and all conditions. However, by reason of the fact that the longitudinal groove of the bolt is provided with an obliquely disposed wall 14, the nut can be conveniently removed from the bolt by means of a suitable tool. In other words, when the flange 15 is struck inwardly to form the indent 16, the latter assumes a configuration corresponding to the shape of the groove of the bolt, and while it serves to positively prevent retrograde movement of the nut, the construction also permits the nut to be turned by a suitable tool for the purpose of removing the nut from the bolt when desired without injury to the thread as the nut is turned the indent will be partly flattened, that is sufficiently to allow the nut to be removed from the bolt.

While it is believed that from the foregoing description the nature and advantages of the invention will be readily understood, I desire to have it known that I do not limit myself to what is herein illustrated and described, and that such changes may be resorted to when desired as fall within the scope of what is claimed.

What I claim is:

The combination with a bolt having a longitudinal groove, one wall of which is obliquely disposed with relation to its opposed wall, a nut adapted to be threaded thereon, an integral uninterrupted annular unthreaded flange of relatively soft material projecting from one end of the nut, and a substantially V-shaped indent struck inwardly from said flange and positioned in said groove, one side of said indent being substantially straight, and the other side inclined to cooperate with the obliquely disposed wall of the groove to remove the indent therefrom upon retrograde movement of the nut.

In testimony whereof I affix my signature.

JAMES C. THOMPSON.